C. M. CHAPMAN.
AUTOMATIC LATHE.
APPLICATION FILED JAN. 9, 1912.
1,083,987.
Patented Jan. 13, 1914.
4 SHEETS—SHEET 1.
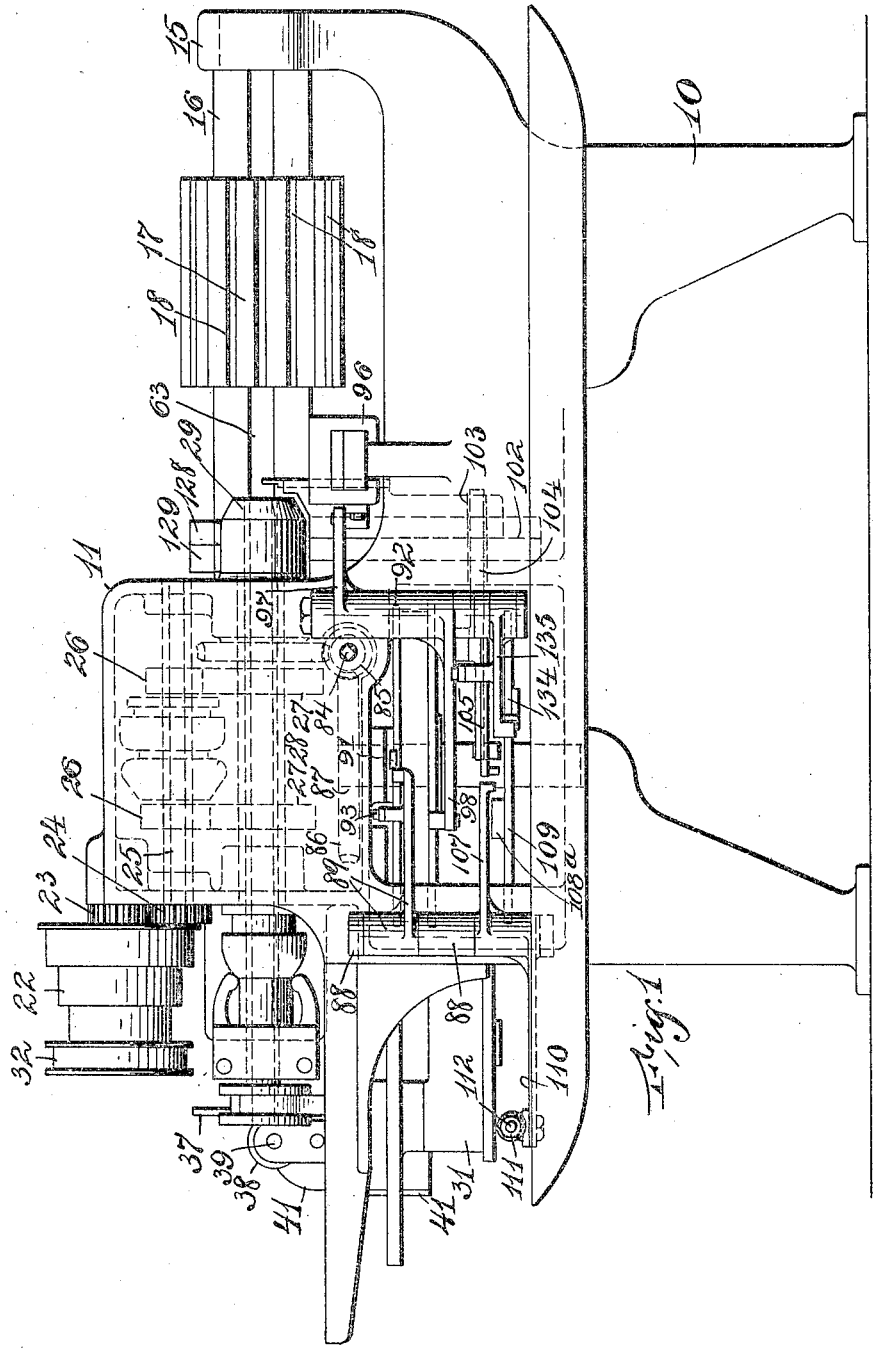
WITNESSES:
M. A. Johnson
L. M. Funke
INVENTOR
Clarence M. Chapman,
BY
Wm. H. Canfield,
ATTORNEY.

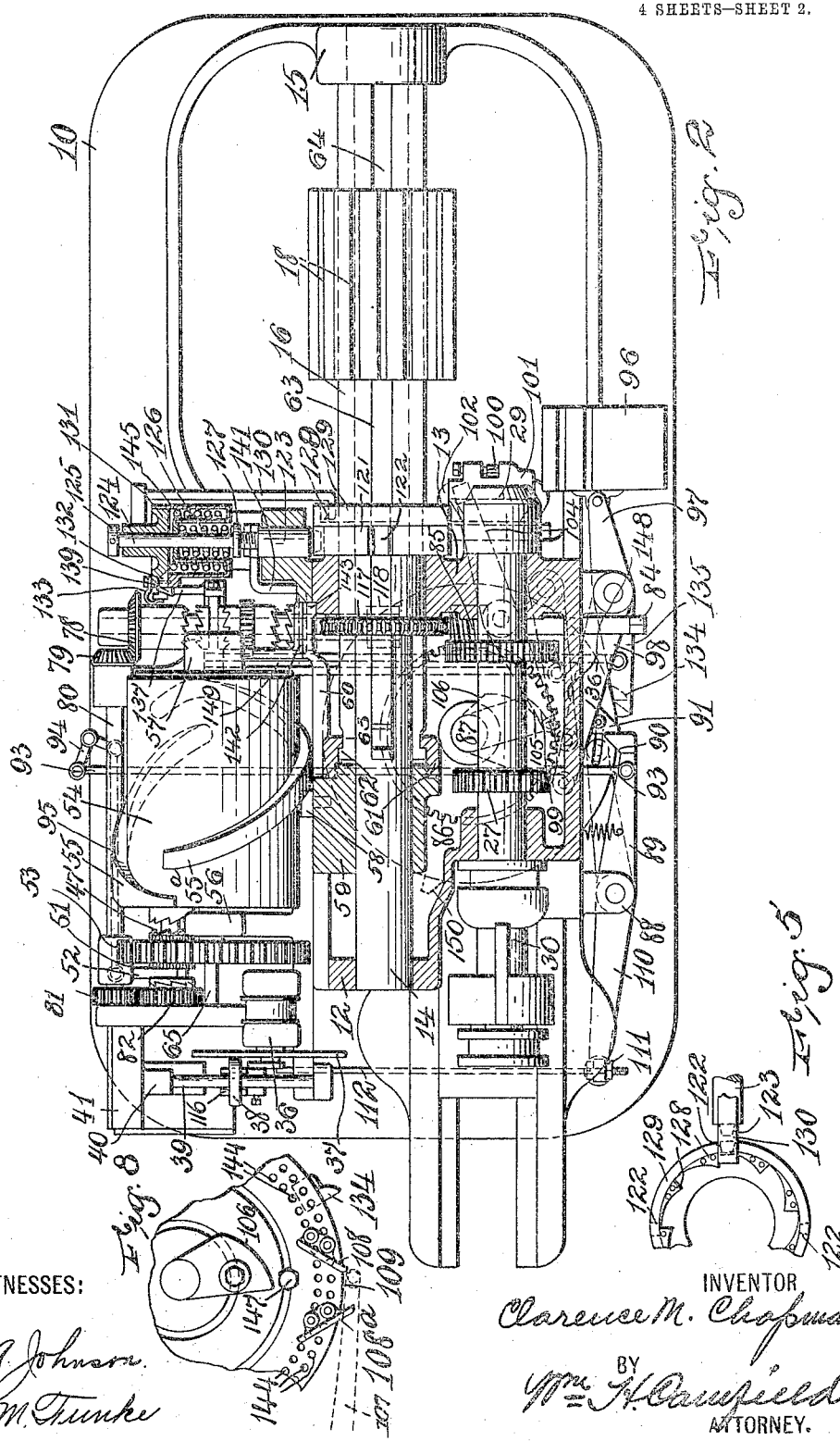

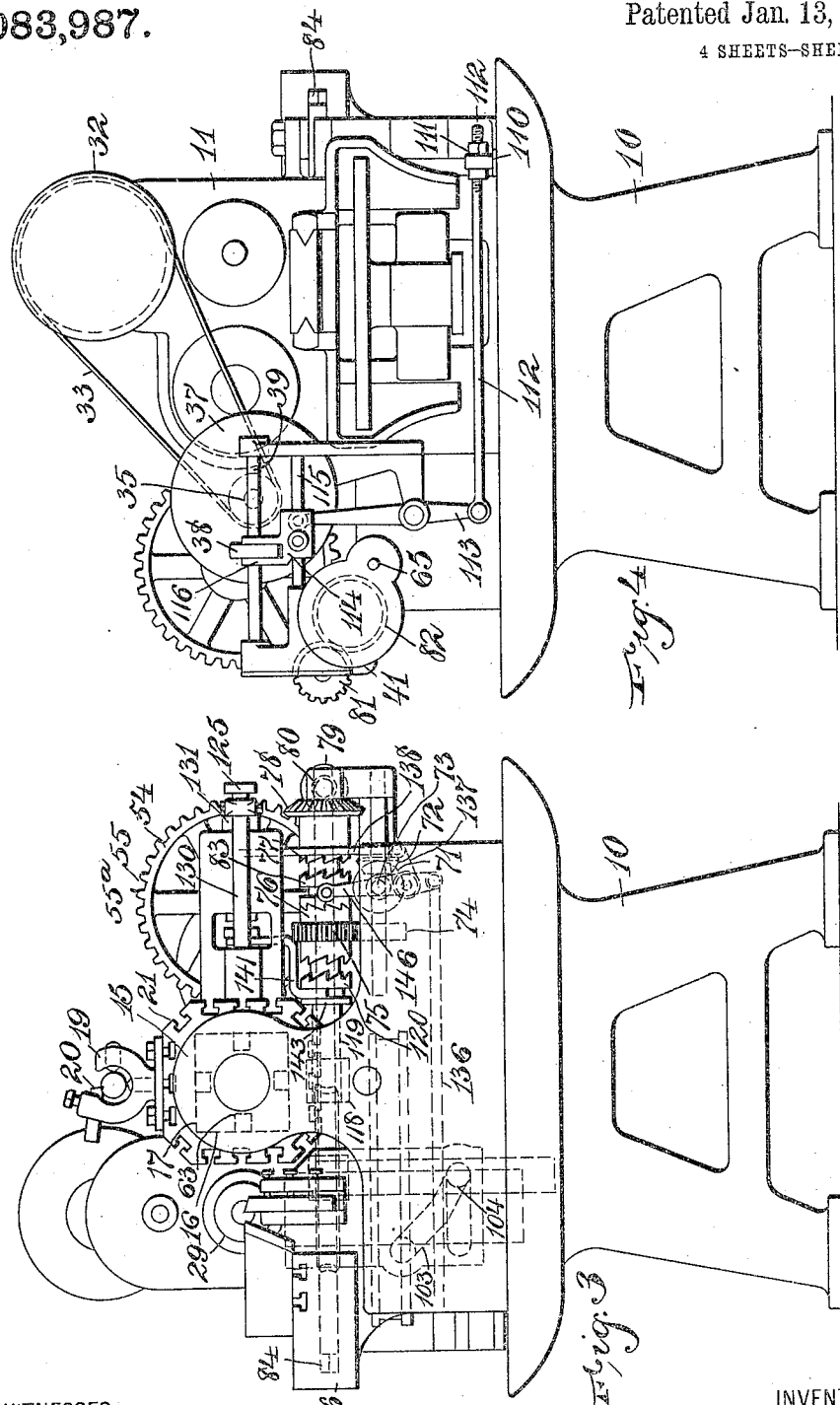

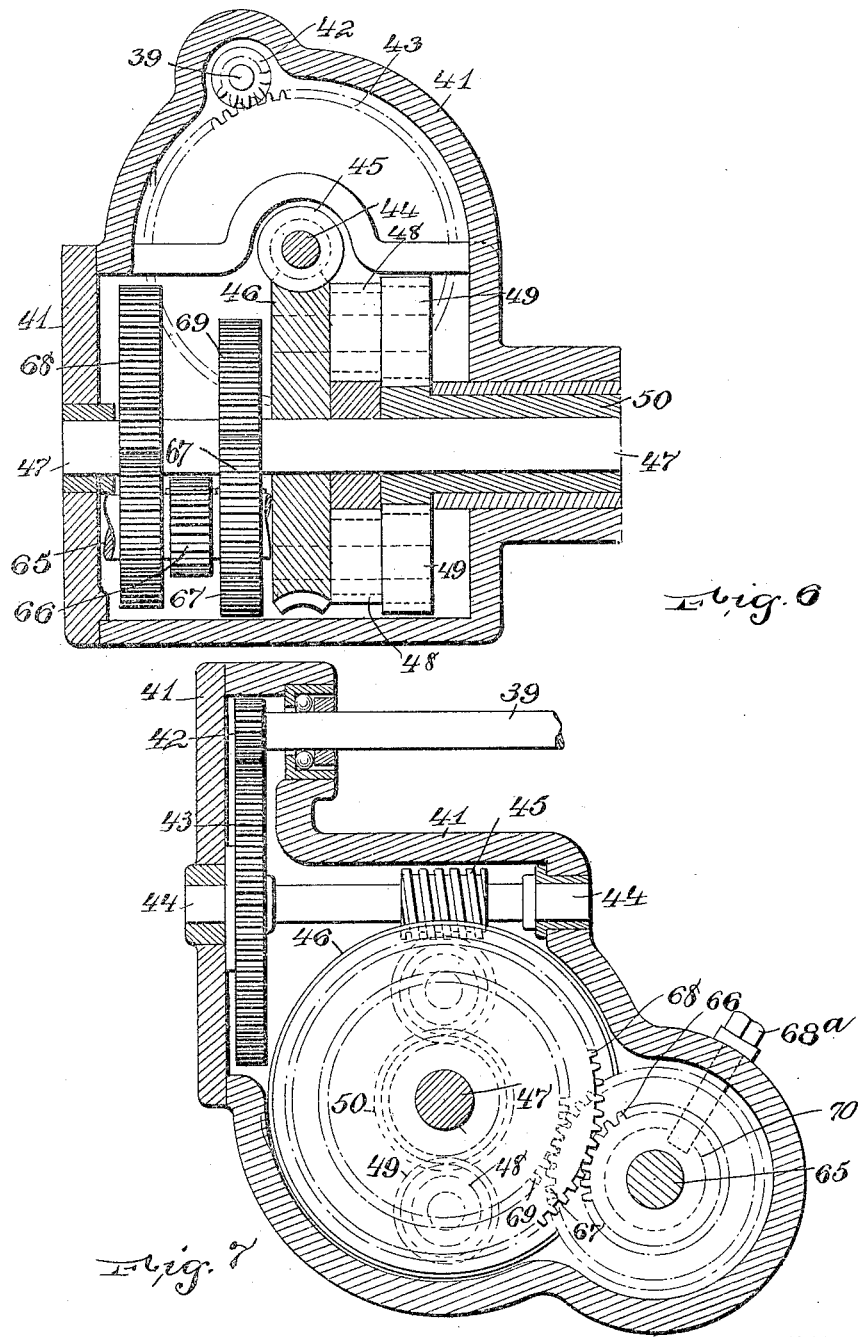

UNITED STATES PATENT OFFICE.

CLARENCE M. CHAPMAN, OF NEWARK, NEW JERSEY.

AUTOMATIC LATHE.

1,083,987.   Specification of Letters Patent.   Patented Jan. 13, 1914.

Application filed January 9, 1912. Serial No. 670,147.

*To all whom it may concern:*

Be it known that I, CLARENCE M. CHAPMAN, a citizen of the United States, residing at Newark, in the county of Essex and State of New Jersey, have invented certain new and useful Improvements in Automatic Lathes; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved lathe of the automatic type which comprises a spindle of any usual form of construction and a stock feed therefor, which stock feed places the work so it can be operated by tools held on a turret. The turret itself is mounted on a turret support, which turret support is rotatable and which can be rotated by a suitable mechanism, this rotation in turn being controlled by an adjustment in the lathe, the turret support being held against rotation when it is desired to hold it rigidly in place. This mounting of the turret support, so that it is supported on both ends, gives a stability and rigidity to the turret which makes it possible to do very accurate work, because the tool has no motion to it except that which is imparted by the mechanism of the machine, and no motion due to spring or poor support of the turret.

The invention further consists in mechanism that can be regulated so as to adjust the movement of the turret in a longitudinal direction on the turret support. The turret and its support are so attached that the turret can not be rotated on the turret support and they must rotate together, but the turret can be slid along the turret support and fed at variable speeds according to the work in the lathe.

The invention further consists in the manner of mounting this turret support and the mechanism for rotating it and for releasing its stop mechanism to permit said rotation, which mechanisms coöperate to bring about the desired movement of the parts in their proper sequence.

The invention further consists in a forming tool-slide and also in a cut-off which have their respective operating mechanisms which can be regulated so as to provide for one or more movements of the turret longitudinally on its support and along the work while the forming tool or the cut-off, or both, are operated but once.

The invention also consists in a regulating mechanism for controlling the rotation of the turret support and the rotative speed of a cam which operates to move the turret along its turret support in a direction parallel to the longitudinal axis of the work, this speed-regulating mechanism being adjustable so that it can be automatically operated by the mechanism of the lathe to vary the speed of the parts at the proper time.

The invention provides a lathe which has a single belt drive and from which all the parts are rotated and regulated, and also one in which the cams are in the front of the machine and easily accessible, and the regulation of the cams and the manual turning mechanism being close together and easily handled. the setting and disposition of the cams and other regulating mechanisms can be accomplished easily and quickly.

The invention further consists in certain details of construction which will be described fully in the specification that follows and incorporated in the claims.

The invention is illustrated in the accompanying drawings, in which—

Figure 1 is a side view of my improved lathe, and Fig. 2 is a top view thereof showing the housing in section. Fig. 3 is a view of one end of the lathe, and Fig. 4 is a view of the other end. Fig. 5 is a view showing a portion of a cam which assists in the operation of the holding means to prevent the rotation of the turret. Fig. 6 is a section of the regulating mechanism, and Fig. 7 is a section taken at right angles to Fig. 6 of the same mechanism. Fig. 8 is a top view broken away showing a cam with adjustable engaging elements for controlling certain operations of the lathe.

The lathe comprises a frame 10 which is of any desired form, and is provided with a standard 11 which is in the form of a housing and has therein the bearings 12 and 13 which support the inner end 14 of the turret support, which turret support has its outer end in the bearing 15 of the frame. In this way the turret support is held with stability and is sustained in its proper position under excessive strain. The outer end 16 of the turret support is rectangular, being preferably made substantially square. On the square portion 16 is arranged the turret 17, the turret being provided with slots 18 for tool-slides 19, which slides in turn are constructed to hold suitable tools 20. The turret can be provided with its corners chamfered as shown particularly in Fig. 3, the chamfered portions having slots 21 for holding suitable tool-slides. Mounted to rotate in the housing is the main shaft of the machine in which is mounted the driving-pulley 22 which transmits its motion through the gears 23 and 24 to a shaft 25. On the shaft 25 are gears 26 which mesh with the two gears 27 to rotate the spindle 28, the spindle being provided on one end with a chuck 29 of any desired form, and on the other end of the spindle is the stock feed 30 which is connected with any suitable form of stock feed actuating mechanism 31, this stock feed actuating mechanism not being described in detail herein, since it can be made of different types, but its connection with the rest of the mechanism will be described a little more in detail hereinafter.

On the main shaft with the pulley 22 is arranged a belt pulley 32 which transmits its motion through a belt or similar transmitting mechanism 33, to a pulley 34 on the shaft 35 which is mounted in the bearings 36, the shaft having on one end a rotating disk 37 against which bears the friction wheel 38 which is arranged to slide in operative, rotative connection with the shaft 39, which shaft 39 extends into the bearing 40 in the upper part of the casing 41, covering a differential gear mechanism which is illustrated in detail in Figs. 6 and 7. The inclosed end of the shaft 39 has a gear 42 thereon which meshes with a larger gear 43, which gear 43 is mounted on a shaft 44 having a worm 45 thereon. The worm meshes with a worm-gear 46, the worm-gear being fastened to the shaft 47, this same worm-gear operating through the differential gears 48 and 49 to transmit its motion to a sleeve 50, the shaft 47 and the sleeve 50 rotating at variable speeds and projecting from the casing 41, the shaft 47 having loosely mounted thereon a gear 51 which slides on the shaft, being actuated by a fork 52, the mechanism for operating which will be described hereinafter. When the gear is moved to one side it is thrown into connection with a clutching mechanism to connect it with the shaft 47, and when it is moved to its other limit of movement it is released from the shaft and connected up with the sleeve 50 so that it can have imparted to it the two different speeds of these respective parts. The gear 51, in both of its positions, is constantly in mesh with a gear 53 which is mounted on the same shaft as the cam-drum 54, which cam-drum is provided with cams 55 and 55ª which are detachably secured thereon, the particular means of fastening the cams 55 not being shown, since there are different ways that this can be done, the cam-drum shaft on which it is mounted and on which the gear 53 is mounted being arranged in the bearings 56 and 57. The cams 55 and 55ª are varied in pitch and also in length to suit any requirements that might arise incidental to the operation of the machine, such pitch and lengths controlling the travel of the turret; and I provide compensating means to be described hereinafter for controlling the speed of the cam drum according to the cams on said drum. This adjustment is desirable because on different classes of work it is necessary to move the turret but a slight distance, and in such operations where but a short piece of stock is operated upon, the retraction and advancing of the turret can be accomplished so as to economize the time to the maximum. The cams are adapted to engage a roller 58 which is arranged on the turret slide 59, which turret slide is mounted to slide on ways 60 in the machine, the turret slide having a collar 61 thereon which embraces the ends 62 of the draw-bars 63, these draw-bars extending in recesses 64 in the turret support and being connected with the turret so that a rotation of the cam-drum imparts a longitudinal sliding movement to the turret, the turret sliding freely on the turret support, since the top of the draw-bars are flush with the outer surface of the square portion of the turret support.

Projecting from the casing 41 is a shaft 65 which has gears within the casing, these gears 66 and 67 being of different sizes and meshing with gears 68 and 69 respectively, which are also of different sizes, which pairs of gears are adapted to give different speeds to the shaft 65, the gears 66 and 67 being thrown in and out of operative connection with the shaft 65 by a clutch-piece 70 which can be moved and also held in its place by a sliding lock-screw 68ª as shown in Fig. 7, the adjustment of the screw being made before the machine is started, since the operator knows beforehand what speed he wishes to employ on the shaft 65. The shaft 65 extends under the cam-drum and terminates in a gear 71 in mesh with a gear 72 on a shaft 73 which has a gear 74 in mesh with a gear 75 connected with a sleeve 76, the sleeve being mounted on a transverse shaft 77 which is provided with a gear 78 which is in mesh with a gear 79, the latter being on a shaft 80, the shaft 80 having a gear 81 which is in mesh with a gear 82, which gear 82 is arranged on the sleeve 50. A sliding clutch 83, to be described hereinafter, regulates the driving of the shaft 77 from either the gear 75 or the gear 78. The clutch 83 is swung by a lever 146 which is operated from the rod 136 which in turn is secured to a lever 135 which is swung by a nose 134 fastened to the edge of the disk 109, shown in Figs. 2 and 8. The transverse shaft projects from the side of the machine and is provided with an end 84 providing for its being turned by a suitable crank or tool. The shaft is provided with a worm 85 meshing with a worm-gear 86 on an upright shaft 87, which upright shaft and its elements regulate the feeding of the stock, the sliding of the forming tool, the operation of the cut-off, the speed of travel of the turret on the turret support, and the indexing of the turret.

Secured to a bracket 88 is a lever 89 which has its cam-end 90 adapted to be swung outward by a cam 150 which is circumferentially adjustable on the disk 92, this lever 89, when swung out thereby, pulling the rod 93 which extends across the machine to the bell-crank 94, and, through the bell-crank 94 and the rod 95, actuates the fork 52. A forming tool slide 96 which carries a suitable forming tool when one is used is operated by levers 97 and 98, the latter being controlled by a cam 99. The cut-off tool 100 is arranged on a cut-off slide 101 which moves in the guide-ways 102 and is provided with a slot 103, which slot is divided into two parts, one having a different angle or inclination than the other, and the lever 104 is placed in the slot 103 so that when the lever is swung its required distance by the lever 105 and the cam 106, the cut-off is moved quickly to bring it into its approximate cutting position by the acute portion of the slot and then slowly forced through the work by the obtuse portion.

In this lathe the forming tool slide and the cut-off tool slide are operated by means independent of the turret sliding mechanism, and the stock can be operated on by the forming tool or by the cut-off tool, and at the same time the turret can be advanced to its working position at high speed, and also retracted to its initial position at high speed.

A feed-regulating lever 107 is mounted in the bracket 88, being actuated by stops 108 and 108$^a$ adjustably secured on the disk 109, the lever 107 having a projecting end 110 which has an adjusting nut 111 connecting it with a rod 112 which extends back, as shown particularly in Fig. 4, to a swinging arm 113 which is fulcrumed on the frame and is connected at its upper end to the sliding sleeve 114 mounted on the rod 115 and having the forks 116 on both sides of the friction wheel 38 to regulate its travel across the path of the disk 37. The stop 108 engages the end of the lever 107 to force it out by means of the roller on its end, and the lever is forced in by the stop 108$^a$, these stops being regulated by their being fastened in the perforations 144 in the disk 109 so that the times of regulation of the speed actuated by this lever can be altered to suit the work in the lathe. A further adjustment is provided by means of the nut 111 for increasing or decreasing the feed of the turret, forming-tool slide and cut-off slide, without adjusting the various stops 108 and 108$^a$. This is accomplished by turning the nut 111 to the right or the left, which, through the rod 112, lever 113, slide 114 and forks 116, operates the roll 38 across the face of the friction disk 37, thereby changing the feed as described.

On the turret support is a gear 117 which is driven by a worm 118 mounted on a sleeve 119, whereby when the sleeve is thrown by the clutch 120 in connection with the gear 75, the turret support is rotated the required distance. An index wheel 121 is also secured on the turret support and is provided with the notches 122 (see Fig. 5) into which is adapted to be seated an indexing pin 123 which is shown engaged in Fig. 2. The indexing pin is mounted on a rod 124 with a collar 125 fastened to its end, being normally sprung forward by a spring 126 bearing on the collar 127. The removable teeth 128 are properly disposed in the proper numbers within the cam-ring 129, these teeth being removable and being adapted to be placed in the machine before its operation begins. The teeth act against a pull-rod 130 which is connected at its back end to a piston 131 and is adapted to pull the piston forward and lock it by means of the latch 132 which is held by the spring 133 so that it is normally pushed inward to lock in the small recess in the piston 131. When the piston 131 is pulled in and latched, it permits the seating of the index pin 123 because it allows the spring 126 to act on the collar 127, as the latch locking the piston 131 overcomes the pressure of the spring 145. When the index pin is to be withdrawn, the adjustable stop 147, fastened to the disk 109, engages the end of the lever 148 which pulls on the rod 149 which is connected to the lever 137. When the lever 148 is thus operated and it pulls the rod 149, the latch 132 is slipped back from contact with the piston 131 and trips the piston which in turn snaps back by reason of the pressure of the spring 145, hits the collar 125, it having a slight momentum by this time, and pulls the index pin 123 from engagement with the index disk, the spring 126 being overcome. When the index pin slides out of contact with the locking ring or indexing ring, it pulls with it the arm 141 which is connected with the clutch 120 so that the sleeve 119 is rotated from the gear 75 and the turret support is turned. When the index pin is forced into the index ring, this arm 141 moves the clutch up against a braking surface 143 and the rotation of the turret support is checked so that it is not carried around by its own momentum and too much strain does not come upon the index pin in stopping the turret support.

The mechanism whereby the withdrawal of the locking pin and the engagement of the turret rotating mechanism is practically instantaneous, is a new feature in machines of this type, and accomplishes this without the operating drum being run on high speed. The rotating of the turret support and the turret and the traverse of the turret on the support can be done at the same time, as the two movements in no way interfere, and being done together, considerable time is saved in accomplishing these two movements together. It will also be noted that the mechanism provides for the indexing of any number of tools on the turret without stopping the turret, since each tool is presented adjacent to the work and can be presented to the work without moving the turret longitudinally on its support for each tool position presented, since the means for rotating the turret and its support is independent from the means for sliding the turret on its support, and the turret rotating means operates regardless of any position the turret may occupy on its support.

The operation of the lathe is as follows:—

The stock is fed through the spindle 28 and firmly held by the chuck 29, being rotated by means of the mechanism hereinbefore described. The forming tool slide 96 advances, being operated by the levers 97 and 98 and the cam 99. When the forming operation has progressed sufficiently for the turning tools, or other tools carried on the turret to act, the cam 150 on the drum 92 engages the lever 89, forcing it out from the position shown in Fig. 2 where it rides on the outside of the cam 150 until the tool is brought nearly up to the work. The rod 93 and the bell-crank 94, along with the rod 95 and the fork 52, operate the sliding gear 51 to bring the gear in contact, through the clutch, with the shaft 47 so that it rotates therewith and imparts a high speed motion to the turret, which is desirable during idle movements. The gear 51 coöperates with the large gear 53 to rotate the cam-drum 54 carrying the detachable cams 55 and 55ᵃ which move the roll 58, the slide 59, and draw-bars 62 to move the turret along its support up to the work, together with the necessary turning tools and appliances attached thereto.

Just prior to the action of tools on the work, the end of the small cam 150 is reached, then the lever 89 is pulled back to the position shown in Fig. 2 by the spring attached to the lever 89 and the frame of the machine in Fig. 2. This action connects the sliding gear 51, by the means just described, with the sleeve 50 which imparts a suitable slow feed to the turret for turning and the various operations performed thereby. The cam-drum 54 continues to rotate at slow speed until the high point of the cam 55ᵃ is reached, which is the point of maximum traverse of the turret. Another cam similar to the cam 150 will again engage the lever 89 and the previously described means for rotating the turret on high speed, which will return it to its initial position. These movements may be repeated according to the requirements of the work being operated upon, or to the maximum number of turret tool positions of the machine, which is, in this particular machine, one to eight.

If it is desired to stop the turret while other tools are working or stock is fed in, a cam one-half the hight of the cam 150 is used, similar to the cam 91, which will cause the lever 89 to ride in a central position, causing the sliding gear 51 and the means just described to remain central between clutches on the shaft 47 and the sleeve 50, thereby stopping the turret until the sliding gear 51 is again engaged by one of the last mentioned clutches. While the turret is returning, and if necessary to index or rotate the turret one or more positions, the stop 147 on the disk 109 engages the lever 148, and by the connecting rod 149 pulls the trigger or latch 132 which releases the piston 131 forced by the heavy spring 145 to withdraw the locking pin and compress the smaller spring 126. This movement also operates the connection 141 which slides the clutch 120 on the sleeve 119 in operative connection with the clutch on the gear 75 which rotates the sleeve 119, and through the worm 118 and the gear 117, rotate the turret. The turret continues to rotate until the small detachable cam 128 (Fig. 5) bears on the pull-rod 130 which in turn moves the piston 131 inward, compressing the large spring 145 and permitting the small spring 126 to force the locking pin 123 against the periphery of the indexing disk 121 where it rides until one of the depressions 122 comes in register with the pin. Then the locking pin, forced by the small spring 126, enters the depression, and in doing so, co-acts on the clutch 120, disengaging the same from its driving members 76 and causing it to bear or connect with a suitable braking surface or stop 143, which function absorbs the momentum of the sleeve, the worm, the worm-gear, and all the elements on the rotating turret and its support. When the piston 131 is pulled in, the latch or trigger 132 holds it in place against withdrawal until the previously described mechanism for releasing the pin is operated. The forming operation being over, the forming tool recedes, and if there be no further operation of the turret tools, the cut-off 100 advances by means of the lever 105 and its cam 106 and severs the bar of stock which completes the operation of one piece. If on the completion of any one piece of work, the disk 109 has not traveled one revolution and it is desired to rotate the remainder on high speed, the nose 134 is attached to the disk 109 and engages the lever 135 which pulls the rod 136 and the lever 146 to operate the clutch 76 which in turn is driven by the gear 75, and the shaft 84 is rotated with the worm 85 and the worm-gear 86 so that the shaft 87 and the disk 109 are swung around at high speed. Fig. 3 shows the mechanism thus engaged.

If it is desired to have variable feed for turret tools, the friction roll 38 is movable across the face of the disk 37 by levers 107 and 110 and the rod 112 with the lever 113. The lever 107 is controlled by small adjustable and detachable cams 108 and 108ᵃ which are fastened to the drum 109 as shown in Fig. 8. The friction roll 38 thus controlled along the face of the disk 37 imparts variable speed to the shaft 39 which, through the train of gears shown in the casing 41 and illustrated in Figs. 6 and 7, transmits the speed to the shaft 47, the sleeve 50 and the shaft 65. I thus control the speed of the cam-drum 54 and indirectly the feed or traverse of the turret and its complement of tools. The end 84 of the shaft 77 is turned by a crank when it is desired to set the cams and automatic adjustable elements in their proper places for one rotation or operation of the machine, and when once so set, the operations will take place in their proper sequence and perform their proper functions at the right time.

Having thus described my invention, what I claim is:—

1. A lathe comprising a frame having bearings therein, a turret support mounted in the bearings and adapted to rotate, a squared portion on the support between the bearings, a turret with a squared opening fitting the support to provide for sliding the turret on the support, the turret support being provided with slots, draw-bars arranged in the slots and attached to the turret for sliding it, a slide in the frame, the slide and the draw-bars having operative connections to permit the rotation of the draw-bars in the slide, means for rotating the support, and means for reciprocating the slide.

2. A lathe comprising a frame, a turret support arranged to rotate in the frame, the frame providing bearings for the support, a squared portion on the turret support between the bearings, a slide, the turret support being round within the slide to provide for the rotation of the support, means for holding the slide against rotation, adjustable means for reciprocating the slide, a turret fitting the squared portion of the turret support, the turret support having slots therein, and draw-bars secured to the turret and connected with the slide, the draw-bars and the slide being connected to permit the sliding of the turret at any point in the rotation of the support.

3. A lathe comprising a rotating turret support, a turret sliding on the support, the turret not being rotatable in relation to the support, means for sliding the turret, a locking ring on the support having recesses therein, a pin to enter the recesses of the ring, means operated from the support for seating the pin to lock the support, and means for withdrawing the pin when the support-rotating means begins to operate.

4. A lathe comprising a rotatable turret support, a turret sliding on the support, the turret not being rotatable in its relation to the support, means for sliding the turret, a regulating shaft, variable driving means for the regulating shaft, a locking ring with recesses on the support, a pin to enter the ring, means operated from the support for seating the pin, and means controlled by the regulating shaft for withdrawing the pin and operating the support-rotating means.

5. A lathe comprising a rotatable turret support, a turret sliding on the support, the turret not being rotatable in its relation to the support, means for sliding the turret, a regulating shaft, variable driving means for the regulating shaft, a locking ring with recesses on the support, a pin to enter the ring, means operated from the support for seating the pin, means controlled by the regulating shaft for withdrawing the pin and operating the support-rotating means, and a brake for the support, said brake being operated from the pin when the pin is seated.

6. A lathe comprising a rotatable turret support, a turret sliding on the support, the turret not being rotatable in its relation to the support, means for sliding the turret, a regulating shaft, variable driving means for the regulating shaft, a locking ring with recesses on the support, a pin to enter the ring, means operated from the support for seating the pin, means controlled by the regulating shaft for withdrawing the pin and operating the support-rotating means, means operated from the regulating shaft for withdrawing the pin from the locking ring, and means actuated by the regulating shaft for rotating the turret support.

7. A lathe comprising a rotatable turret support, a turret sliding on the support, the turret not being rotatable in its relation to the support, means for sliding the turret, a regulating shaft, variable driving means for the regulating shaft, a locking ring with recesses on the support, a pin to enter the ring, means operated from the support for seating the pin, means controlled by the regulating shaft for withdrawing the pin and operating the support-rotating means, means operated from the regulating shaft for varying the speed of the turret-sliding means, means operated from the regulating shaft for withdrawing the pin from the locking ring, and means actuated by the regulating shaft for rotating the turret support.

8. A lathe comprising a frame having bearings therein, a turret-support rotatable in the bearings and having a squared portion between the bearings, a turret having a squared longitudinal opening to fit the square portion of the support and adapted to slide thereon, the support having slots in its sides, draw-bars attached to the turret and arranged in the slots with their outer faces engaging the turret, and means for moving the bars to slide the turret longitudinally.

9. An automatic lathe comprising a frame having bearings therein, a turret-support rotatable between the bearings, a turret on the support, means for sliding the turret at any point in its rotation, automatic means for rotating the turret irrespective of the location of the turret, means for disconnecting the rotating means at any point in the rotation of the turret, locking means operable whenever the rotating means is inoperative, and means for actuating the locking means.

10. An automatic lathe comprising a frame, a turret-support in the frame, a turret slidable longitudinally on the turret-support, a main shaft, means for rotating the turret-support from the main shaft, means for locking the turret-support against rotation, an operative connection between the locking means and the turret-support for causing the locking means to lock the turret-support, and means for releasing the locking means from the main shaft.

11. An automatic lathe comprising a frame, a turret-support in the frame, a turret slidable longitudinally on the turret-support, a main shaft, means for rotating the turret-support from the main shaft, means for locking the turret-support against rotation, an operative connection between the locking means and the turret-support for causing the locking means to lock the turret-support, means for releasing the locking means from the main shaft, and means for sliding the turret irrespective of the rotative position of the turret-support.

12. An automatic lathe comprising a frame, a turret-support in the frame, a turret slidable longitudinally on the turret-support, a main shaft, means for rotating the turret-support from the main shaft, means for locking the turret-support against rotation, an operative connection between the locking means and the turret-support for causing the locking means to lock the turret-support, means for releasing the locking means from the main shaft, means for sliding the turret irrespective of the rotative position of the turret-support, and an adjustable mechanism for timing the sliding of the turret.

13. An automatic lathe comprising a frame, a turret-support in the frame, a turret slidable longitudinally on the turret-support, a main shaft, means for rotating the turret-support from the main shaft, means for locking the turret-support against rotation, and means for releasing the locking means from the turret-support.

14. An automatic lathe comprising a frame, a turret-support in the frame, a turret slidable longitudinally on the turret-support, a main shaft, means for rotating the turret-support from the main shaft, means for locking the turret-support against rotation, adjustable means for releasing the locking means from the turret-support, and means for sliding the turret on its support at various speeds.

15. An automatic lathe comprising a frame, a turret-support in the frame, a turret slidable longitudinally on the turret-support, a main shaft, means for rotating the turret-support from the main shaft, means for locking the turret-support against rotation, adjustable means for releasing the locking means from the turret-support, and adjustable means for sliding the turret on its support at various speeds.

16. An automatic lathe comprising a rotatable turret-support with a turret thereon, means for rotating the turret-support, a notched disk on the turret-support, a pin to enter the notches of the disk, a spring to force the pin in engagement with the notches, a second spring stronger than the first spring to force the pin from the notches, a latch for locking and tripping the second spring to permit the first spring to force the pin to its locked position, and means for forcing the second spring to its compressed position to be locked.

17. An automatic lathe comprising a rotatable turret-support with a turret thereon, means for rotating the turret-support, a pin to engage the support to lock it, a spring to force the pin to the support to lock it, a second spring stronger than the first and opposed thereto to force the first spring and the pin from its engaging position, a latch to lock the second spring in compressed position, adjustable means for releasing the latch to cause the pin to be withdrawn by the second spring, and adjustable means on the support operatively connected with the second spring to compress it to its latched position.

18. An automatic lathe comprising a rotatable turret-support, a turret on the support, the turret having tool slides for holding tools at different points radially, means for rotating the turret-support, a locking means for the turret-support connected with the rotating means to disconnect the rotating means when the locking means is in locking position, and means adjustable on the support for operating the locking means to stop the turret-support to correspond with the location of predetermined tool slides.

19. An automatic lathe comprising a rotatable turret-support, a turret on the support, the turret having tool slides for holding tools at different points radially, means for rotating the turret-support, a locking means for the turret-support connected with the rotating means to disconnect the rotating means when the locking means is in locking position, adjustable and detachable teeth on the turret-support, and a pull-rod connected to the locking means and in the path of the teeth for causing the locking of the turret-support.

20. In an automatic lathe, a turret adapted to slide, means for reciprocating the turret, said means comprising a cam drum, a sliding gear constantly connected to the cam drum, and clutch members with which the sliding gear alternately engages, said clutch members having different speeds.

21. In an automatic lathe, a turret adapted to slide, means for reciprocating the turret, said means comprising a cam drum, a sliding gear constantly connected to the cam drum, clutch members with which the sliding gear alternately engages, said clutch members having different speeds, and means for automatically shifting said sliding gear.

22. In an automatic lathe, a turret adapted to slide, means for reciprocating the turret, said means consisting of a cam drum, detachable cams on the cam drum, the detachable cams being so formed that one revolution of the cam drum imparts a forward and backward movement to the turret, and means for varying the speed of the cam drum during a single rotation.

23. In an automatic lathe, a turret adapted to be reciprocated, means for reciprocating the turret, said means comprising a friction disk, a roller movable across the face of said disk for varying the speed thereof, a cam for actuating said roller to control the speed of the turret, and an adjusting device between the cam and the roller.

24. In an automatic lathe, a turret adapted to be reciprocated, means for reciprocating the turret, said means comprising a friction disk, a roller movable across the face of said disk for varying the speed thereof, a cam for actuating said roller to control the speed of the turret, an adjusting device between the cam and the roller, a rod connected to said roller, a lever actuated by the cam, said rod passing through one end of said lever, and a nut on the rod for adjusting the relative positions of the rod and the lever.

25. In a lathe, a turret adapted to slide, cam, rotatable for operating the turret, a forming-tool operating mechanism, and means for imparting variable speed to the rotating cams without affecting the forming-tool operating mechanism.

In testimony, that I claim the foregoing, I have hereunto set my hand this 6th day of January, 1912.

CLARENCE M. CHAPMAN.

Witnesses:
CHARLES L. BARROWS,
GRAHAM H. JACKSON.

---

Copies of this patent may be obtained for five cents each, by addressing the "Commissioner of Patents, Washington, D. C."